United States Patent
Lee

(10) Patent No.: US 7,801,477 B2
(45) Date of Patent: Sep. 21, 2010

(54) BROADCASTING SYSTEM AND METHOD OF CONTROLLING THE SAME

(75) Inventor: Jae Kyung Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 906 days.

(21) Appl. No.: 11/177,586

(22) Filed: Jul. 11, 2005

(65) Prior Publication Data

US 2006/0030336 A1 Feb. 9, 2006

(30) Foreign Application Priority Data

Jul. 12, 2004 (KR) .............. 10-2004-0054136

(51) Int. Cl.
*H04H 60/09* (2008.01)
(52) U.S. Cl. .................... 455/3.04; 455/3.01
(58) Field of Classification Search .......... 455/5.1, 455/3.04
See application file for complete search history.

(56) References Cited

U.S. PATENT DOCUMENTS 6,157,809 A * 12/2000 Kambayashi ............. 725/91
2004/0083291 A1 4/2004 Pessi et al.
2004/0128690 A1 7/2004 Zohar Ariely
2005/0186957 A1 * 8/2005 Sako et al. ................ 455/423

FOREIGN PATENT DOCUMENTS

| KR | 10-2001-0010109 A | 2/2001 |
| KR | 10-2001-0059645 A | 7/2001 |
| WO | WO-01/63430 A1 | 8/2001 |
| WO | WO-2004/030310 A1 | 4/2004 |
| WO | WO-2004/034689 A2 | 4/2004 |

* cited by examiner

*Primary Examiner*—Yuwen Pan
*Assistant Examiner*—Ankur Jain
(74) *Attorney, Agent, or Firm*—Birch, Stewart, Kolasch & Birch, LLP

(57) ABSTRACT

A broadcasting system for providing a broadcasting program to a mobile terminal and a method of controlling the same are provided. The method includes the steps of selecting a broadcasting program through a mobile terminal, selecting a broadcasting type of the selected broadcasting program through the mobile terminal, selectively transmitting at least one of video data, audio data, and text data of the selected broadcasting program based on the selected broadcasting type from a broadcasting station server to the mobile terminal, and displaying the transmitted data on the mobile terminal or outputting the transmitted data through the mobile terminal.

25 Claims, 8 Drawing Sheets

BROADCASTING SYSTEM AND METHOD OF CONTROLLING THE SAME

This application claims the benefit of the Korean Application No. 10-2004-0054136 filed on Jul. 12, 2004, which is hereby incorporated by reference.

BACKGROUND OF THE INVENTION

1. Field of the Invention

The present invention relates to a broadcasting system, and more particularly, to a broadcasting system for providing a broadcasting program to a mobile terminal and a method of controlling the same.

2. Discussion of the Related Art

Use of mobile terminals such as a mobile phone or a personal data assistance (PDA) has rapidly increased and the mobile terminal is a necessity of life nowadays. The mobile terminal downloads various information or programs through a wireless Internet and stores the downloaded information or program. The mobile terminal also runs the downloaded program. For example, a user can play a game or reproduce music stored in the mobile terminal by using the mobile terminal without limitation of time and location.

According to demand for a mobile terminal to receive a broadcasting program, there are various studies in progress for developing a mobile terminal for receiving and displaying a broadcasting program and a broadcasting system for transmitting the broadcasting program to the mobile terminal. However, there are many difficulties to receive and display the broadcasting program by using the mobile terminal because of a data size of the broadcasting program. Furthermore, other functions of the mobile terminal such as receiving a call or a short message service (SMS) cannot be performed simultaneously while the mobile terminal displays the broadcasting program.

FIG. 1 illustrates a block view of a related art broadcasting system providing broadcasting programs to a mobile phone. FIG. 2 illustrates a method for controlling the related art broadcasting system. Referring to FIG. 1 and FIG. 2, a user connects a mobile phone 10 to a server 31 (S11). Then, the user selects a broadcasting program stored in a database 32 (S12). Thereafter, the server 31 transmits the selected broadcasting program to the mobile phone 10 through a base station. Subsequently, the mobile phone 10 stores the transmitted broadcasting program and displays the stored broadcasting program onto a screen (S13).

If an incoming call is transmitted to the mobile phone 10 while the broadcasting program is being displayed (S14), the mobile phone 10 discontinues the display of the broadcasting program and performs only the general call-receiving function (S15). Since the display of the broadcasting program has been discontinued, the user is unable to resume the viewing of the broadcasting program even after the end of the telephone conversation. Therefore, in order to continue the viewing of the program, the user should replay the broadcasting program through the mobile phone 10 starting from the beginning.

Additionally, due to the data size of the broadcasting program, there lie many difficulties in easily receiving/displaying broadcasting programs through the conventional mobile terminals. Furthermore, the conventional mobile terminals are disadvantageous in that other functions (i.e., searching stored information, receiving SMS, etc.) cannot be performed while viewing the broadcasting programs through the mobile terminal.

SUMMARY OF THE INVENTION

Accordingly, the present invention is directed to a broadcasting system and method of controlling the same that substantially obviates one or more problems due to limitations and disadvantages of the related art.

An object of the present invention is to provide a broadcasting system for selectively transmitting one or more of video data, audio data and text data of a broadcasting program to a mobile terminal and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

One or more of these and other objects of the invention may be accomplished by a method of controlling a broadcasting system, comprising the steps of selecting a broadcasting program through a mobile terminal; selecting a broadcasting type of the selected broadcasting program through the mobile terminal; selectively transmitting at least one of video data, audio data, and data of the selected broadcasting program based on the selected broadcasting type from a broadcasting station server to the mobile terminal; and displaying the transmitted data on the mobile terminal or outputting the transmitted data through the mobile terminal.

One or more of these and other objects of the invention may be accomplished by a method of controlling a broadcasting system, comprising the steps of selecting a broadcasting program through a mobile terminal; selecting a broadcasting type of the selected broadcasting program through the mobile terminal; selectively transmitting at least one of video data, audio data, and data of the selected broadcasting program based on the selected broadcasting type from a broadcasting station server to the mobile terminal; displaying the transmitted data on the mobile terminal or outputting the transmitted data through the mobile terminal; and interrupting the display of the transmitted data with a time shift function of the mobile terminal, the time shift function permitting an alternative transmission of data to be monitored by a user of the mobile terminal instead of the transmitted data of the selected broadcasted program.

One or more of these and other objects of the invention may be accomplished by a broadcasting system, comprising a mobile terminal for selecting a broadcasting program and a broadcasting type to be displayed on the mobile terminal; and a broadcasting station server for selectively transmitting at least one of video data, audio data and data of the selected broadcasting program according to the selected broadcasting type.

One or more of these and other objects of the invention may be accomplished by a broadcasting system, comprising a mobile terminal for selecting a broadcasting program and a broadcasting type to be displayed on the mobile terminal; a broadcasting station server for selectively transmitting at least one of video data, audio data and data of the selected broadcasting program according to the selected broadcasting type; and a time shift function for interrupting a display of the broadcasting program on the mobile terminal, the time shift function permitting an alternative transmission of data to be monitored by a user of the mobile terminal instead of the transmitted data of the selected broadcasted program.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
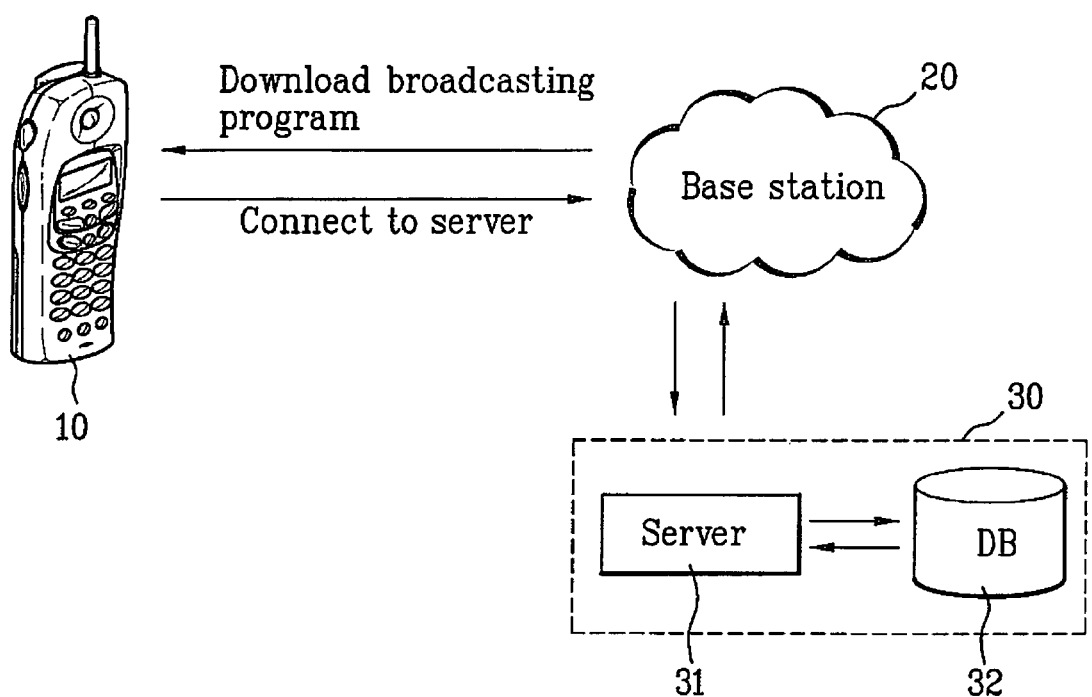
FIG. 1 illustrates a structure of a broadcasting system in accordance with the related art.
Figure 2:
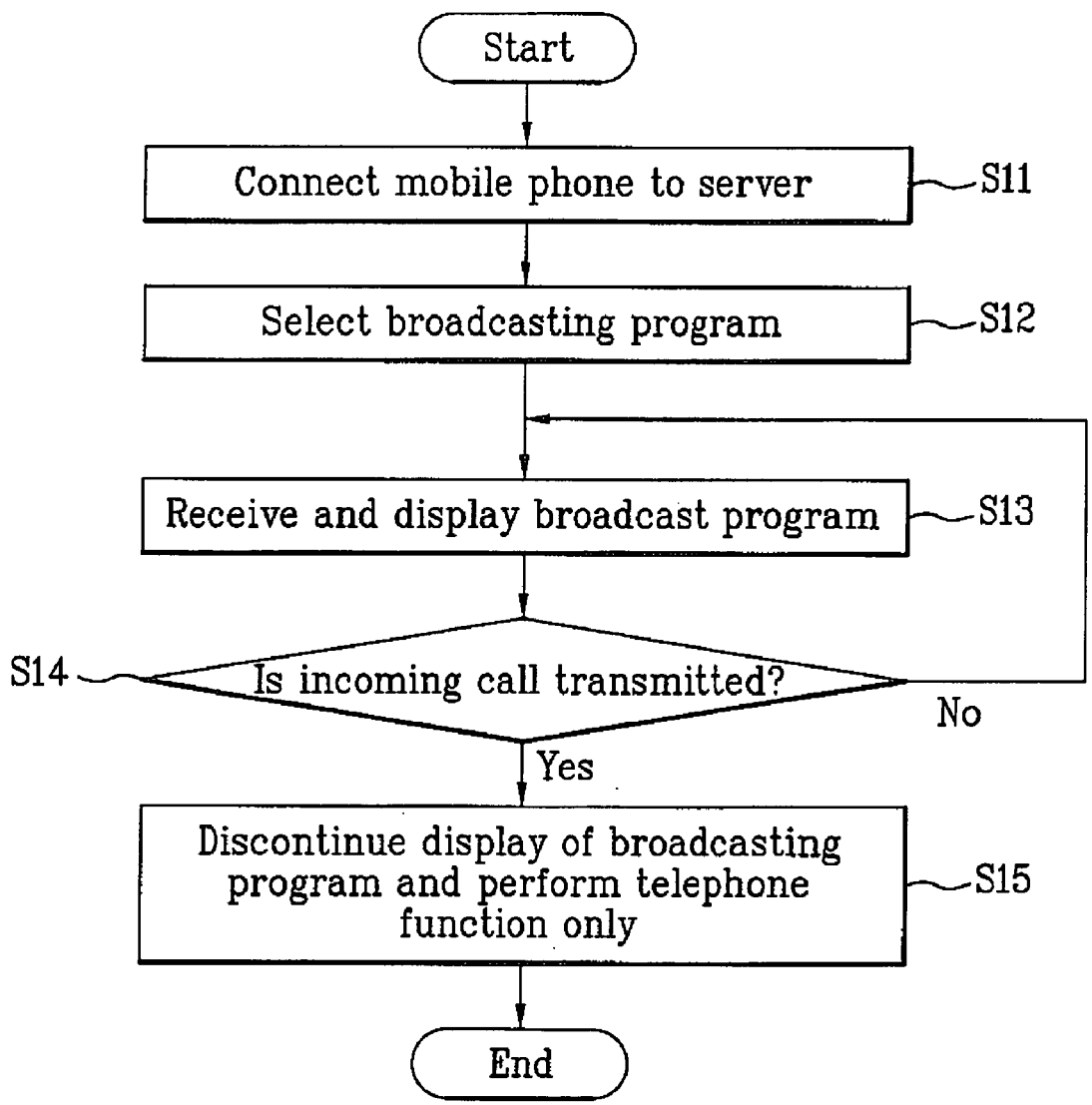
FIG. 2 illustrates a method for controlling the related art broadcasting system.
Figure 3:
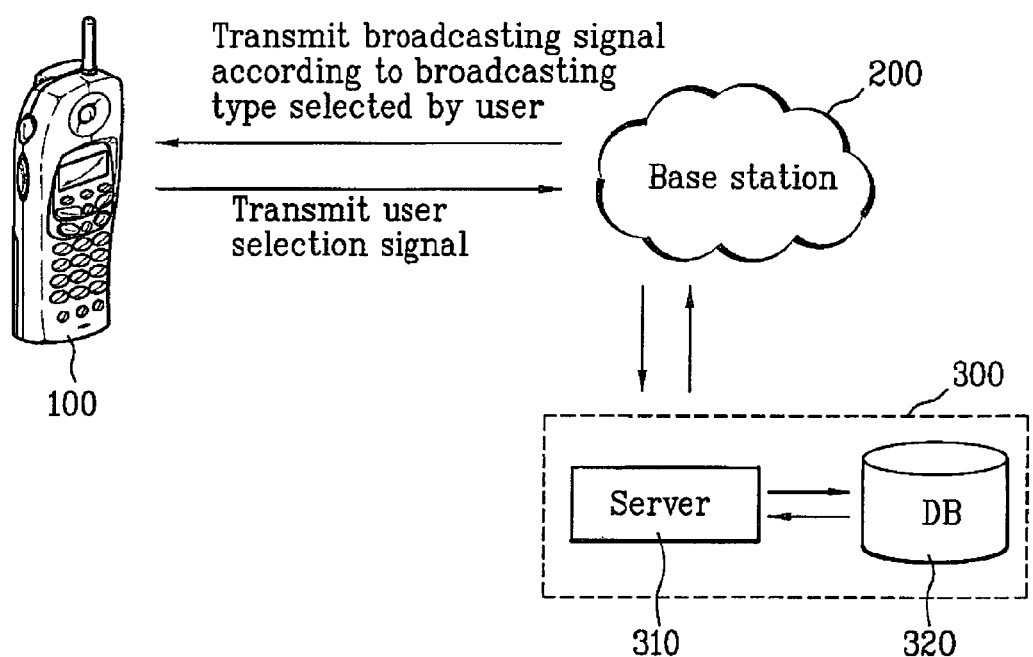
FIG. 3 illustrates a broadcasting system according to the present invention.

FIG. 3 illustrates a broadcasting system according to an embodiment of the present invention. The broadcasting system of the present embodiment includes a mobile terminal 100, a base station 200, a server 310 of a broadcasting station 300 and a database DB 320.

The mobile terminal 100 may be a mobile phone, a portable multimedia player (PMP), a personal digital assistant (PDA) or a notebook computer.

Figure 4:
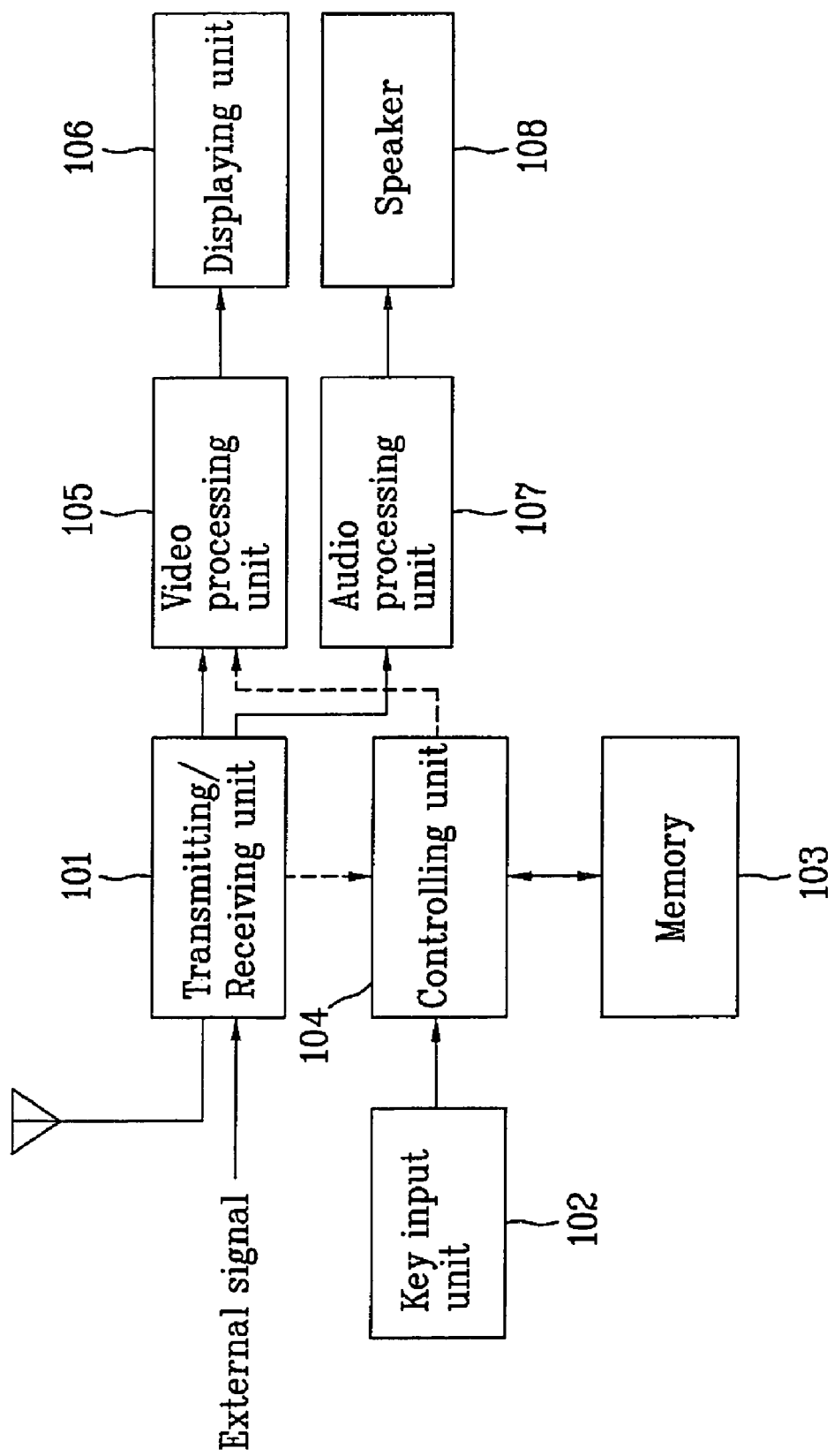
FIG. 4 illustrates a mobile terminal shown in FIG. 3.

FIG. 4 illustrates the mobile terminal 100 shown in FIG. 3.

As shown in FIG. 4, the mobile terminal 100 includes a transmitting/receiving unit 101, a key input unit 102, a memory 103, a controlling unit 104, a video processing unit 105, a displaying unit 106, an audio processing unit 107 and a speaker 108. The transmitting/receiving unit 101 either receives a broadcasting signal through the base station 200 or receives external signals from an external device (e.g., a DVD, a personal video recorder (PVD), etc.). The transmitting/receiving unit 101 includes a tuner for selecting a broadcasting signal corresponding to each channel, and a demultiplexer for separating the received broadcasting signal to a video signal, an audio signal, and a data signal (i.e., supplementary information). The transmitting/receiving unit 101 transmits the video signal to the video processing unit 105 and the audio signal to the audio processing unit 107. The transmitting/receiving unit 101 also stores the supplementary information in the memory 103, i.e., video RAM through the controlling unit 104. Furthermore, the transmitting/receiving unit 101 transmits a command of a user inputted through the key input unit 102 to the broadcasting station 300 through the base station 200. For example, the transmitting/receiving unit transmits a selection signal of a user to the broadcasting station 300 for selecting at least one of video signal, audio signal, and text (e.g., subtitle) which are included in the broadcasting signal. The video processing unit 105 converts the text, which is included in the data signal, and the video signal to displayable data.

The server 310 of the broadcasting station 300 or a transmitting device transmits a broadcasting signal in real-time or outputs a broadcasting signal stored in the DB 320. The broadcasting signal transmitted from the server 310 generally includes video signal, audio signal, and data signal. However, when the server 310 receives the selection signal of the user from the mobile terminal 100, the server 310 may selectively transmit one of the video signal, the audio signal, and the text based on the selection signal to the base station 200.

Hereinafter, a method of controlling the broadcasting system according to the present embodiment will be explained in detail.

Figure 5:
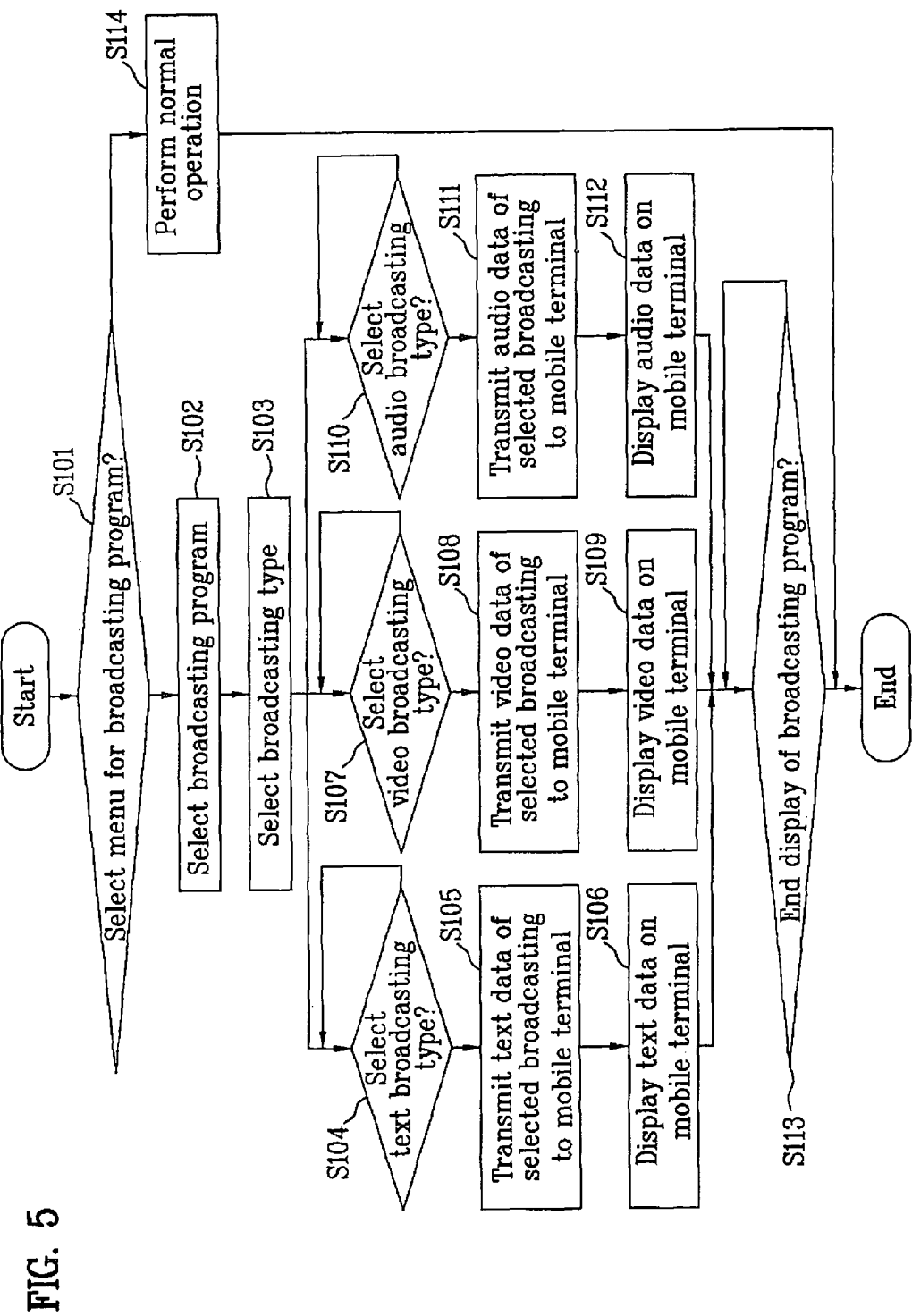
FIG. 5 is a flowchart of a method of controlling the broadcasting system according to the present invention.

FIG. 5 is a flowchart of a method of controlling a broadcasting system in accordance with an embodiment of the present invention.

Figure 6:
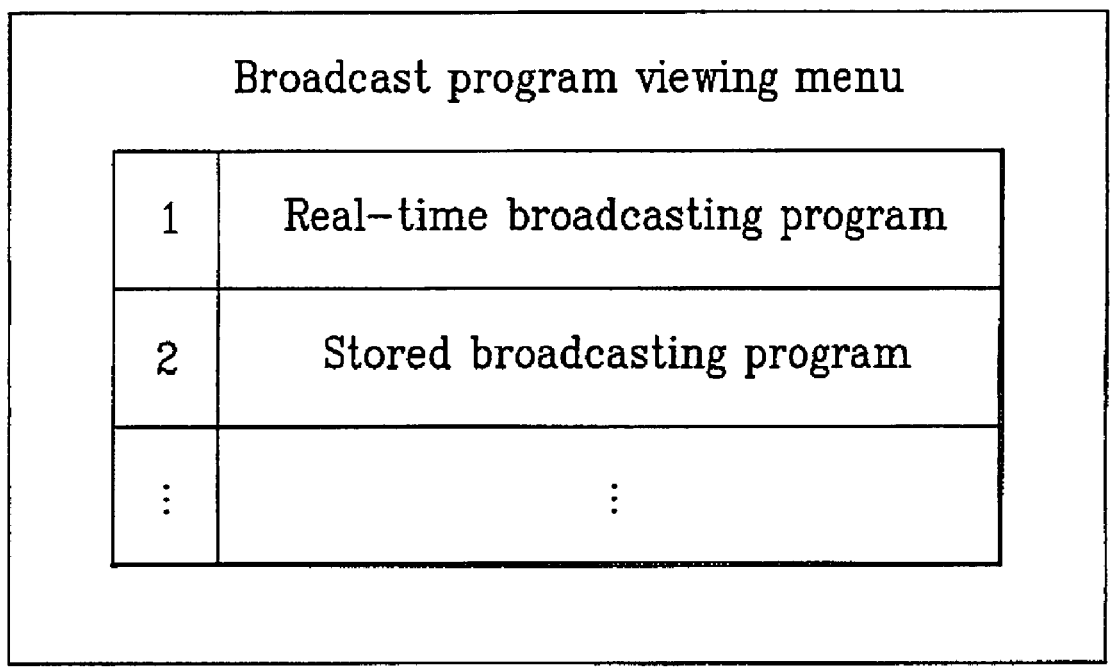
FIG. 6 illustrates an example of a viewing menu for a broadcasting program.

Referring to FIG. 5, when a user turns on the mobile terminal 100 and selects a menu for broadcasting program by using the key input unit 102 (S101), the mobile terminal 100 displays options related to the menu for broadcasting program on the displaying unit 106, as shown in FIG. 6. For example, the mobile terminal 100 displays options for receiving a real-time broadcasting program or a stored broadcasting program. The user may be select one of options displayed on the displaying unit 106.

If the user selects the option for receiving the real-time broadcasting program, the server 310 of the broadcasting station 300 transmits broadcasting program information, e.g., electronic program guide (EPG), which is information of broadcasting programs currently broadcasting, to the mobile terminal 100 through the base station 200. If the user selects the option for the stored broadcasting program, the server 310 transmits information of broadcasting programs stored in the DB 320 to the mobile terminal 100 through the base station 200. The broadcasting program information outputted from the server 310 includes a title of a broadcasting program, a running time of a broadcasting program and broadcasting types of a broadcasting program e.g., video broadcasting, audio broadcasting or text broadcasting.

Figure 7:
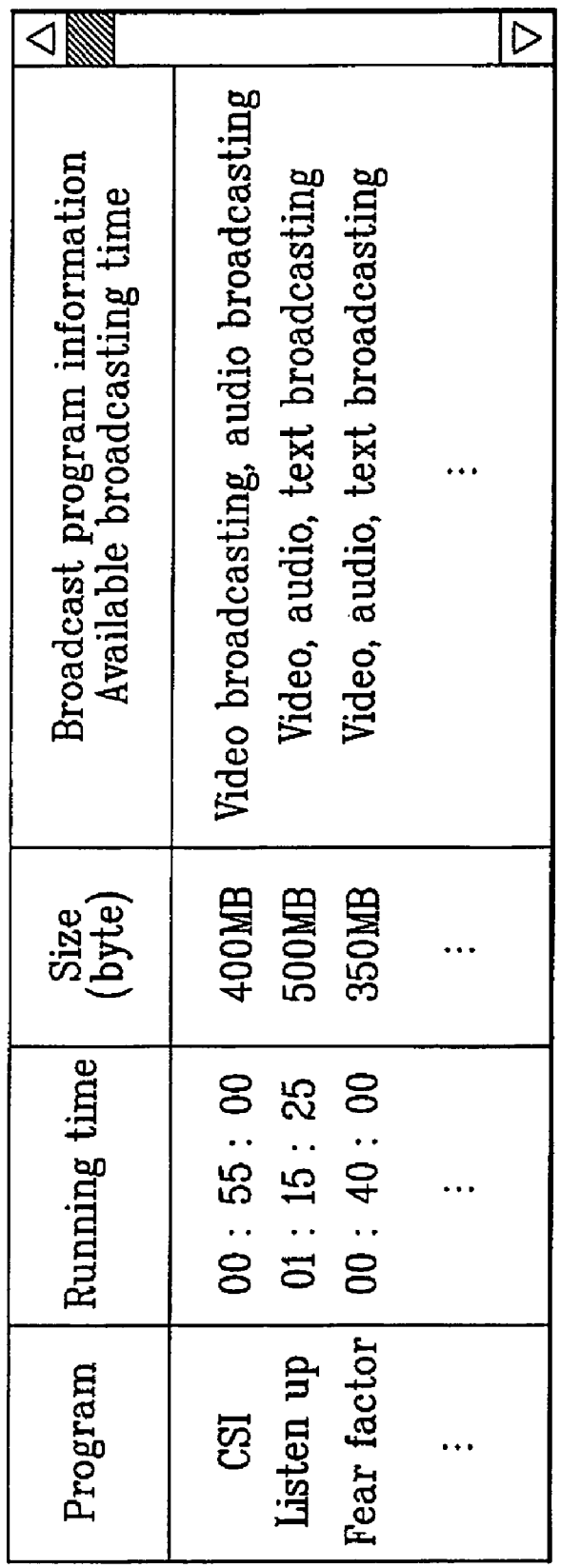
FIG. 7 illustrates an example of broadcasting program information.

The mobile terminal 100 receives and displays the broadcasting program information at the displaying unit 106, as shown in FIG. 7. A user selects a desired broadcasting program based on the displayed broadcasting information (S102), and also selects a broadcasting type of the selected broadcasting program (S103). For example, a user may select one or more of video, audio, and text (e.g., subtitle) of the selected broadcasting program as the broadcasting type after selecting the broadcasting program. In addition, the user may select a display start time of the selected broadcasting program when the selected broadcasting program is a broadcasting program stored in the DB 320.

The mobile terminal 100 generates a selection signal based on user's selection of the broadcasting type and transmits the selection signal to the broadcasting station 300 through the base station 200. The server 310 determines a broadcasting program and a broadcasting type selected by the user based on the selection signal. That is, the server 310 determines which broadcasting type is selected among video broadcasting, audio broadcasting or text broadcasting by a user for the selected broadcasting program.

If the user only selects the text broadcasting as the broadcasting type (S104), the server 310 transmits only text data of the selected broadcasting program to the mobile terminal 100 through the base station 200 (S105). The mobile terminal 100 displays the transmitted text data on the displaying unit 106 (S106).

If the user only selects the video broadcasting as the broadcasting type (S107), the server 310 transmits only video data of the selected broadcasting program to the mobile terminal 100 through the base station 200 (S108). The mobile terminal 100 displays the transmitted video data on the displaying unit 106 (S109).

If the user only selects the audio broadcasting as the broadcasting type (S110), the server 310 transmits only audio data of the selected broadcasting program to the mobile terminal 100 through the base station 200 (S111). The mobile terminal 100 outputs the transmitted audio data on the displaying unit 106 (S112).

If two or more broadcasting types are selected, the server 310 transmits data of selected broadcasting types to the mobile terminal 100. For example, the user selects the text and the video as the broadcasting type of the selected broadcasting program, the server 310 transmits text data and video data of the selected broadcasting program to the mobile terminal 100.

Figure 8:
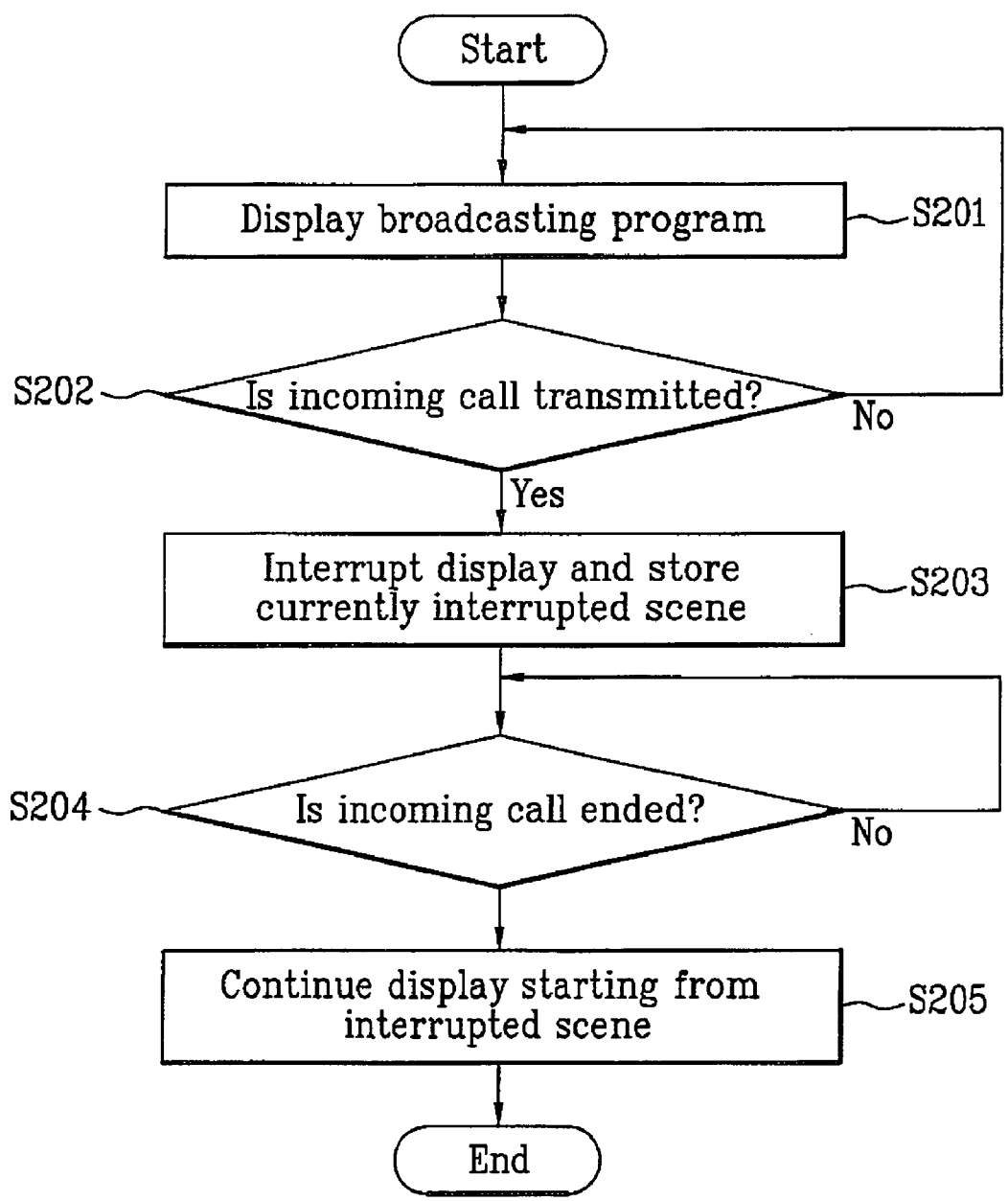
FIG. 8 illustrates a time shifting function of the mobile terminal and a time shifting method.

FIG. 8 illustrates a flow chart of a method for controlling the mobile terminal 100 when an incoming call is transmitted to the mobile terminal 100 during a display of the broadcasting program. The mobile terminal 100 according to the present invention is provided with a time shift function. The time shift function allows the user to select a time shift key while viewing an image so as to store a scene of the image at the point the time shift key is selected. Thus, when a specific key is selected, the image can be reproduced (or played-back) (i.e., display of the image may be continued) starting from the stored scene. The user can input on/off pre-settings of the time shift function.

Referring to FIG. 8, while the broadcasting program is displayed on the screen (S201), the mobile terminal 100 determines whether an incoming call is transmitted or an SMS is received (S202). In case of receiving a call or a short message service while the broadcasting program is displayed on the mobile terminal 100, the mobile terminal 100 interrupts display of the broadcasting program and stores last displayed video data, text data and/or audio data of the broadcasting program (S203). After storing, a telephone ring is played or a short message is displayed. After hanging up the call or reading the short message (S204), the mobile terminal 100 once again displays/outputs the stored image, text and/or audio data.

When the user terminates to display the broadcasting program (S113) or when the user does not select "broadcasting program" menu, the mobile terminal 100 performs normal operations (S114).

As is apparent from the above description, in the present embodiment, the mobile terminal displays the broadcasting program based on selected broadcasting types of the broadcasting program. Therefore, the present embodiment can overcome the difficulty of displaying a broadcasting program on the mobile terminal that is caused by data overload because the present embodiment selectively receives video data, text data and/or audio data of the broadcasting program and display the broadcasting program based on the selected broadcasting type.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling a broadcasting system, the method comprising:
    selecting a broadcasting program through a mobile terminal;
    selecting a broadcasting type of the broadcasting program through the mobile terminal, the broadcasting type being selected from at least two of video data broadcasting, audio data broadcasting and text data broadcasting;
    receiving at the mobile terminal at least one of video data, audio data, and text data of the broadcasting program, the broadcasting program data being selectively transmitted from a broadcasting station server according to the selected broadcasting type; and
    outputting the received broadcasting program data through the mobile terminal;
    selectively interrupting the output of the broadcasting program data using a time-shift function of the mobile terminal, the time-shift function enabling alternatively received data to be output through the mobile terminal while the broadcasting program data being transmitted from the broadcasting station server is time-shifted according to the time-shift function using a storage medium provided to the broadcasting station server; and
    selectively continuing the output of the broadcasting program data through the mobile terminal by causing the data transmission from the broadcasting station server to continue, the continuing data transmission beginning from a point of data transmission corresponding to the interruption.

2. The method according to claim 1, wherein the broadcasting program and the broadcasting type are selected based on broadcasting program information received from the broadcasting station server.

3. The method according to claim 2, wherein the broadcasting program information includes at least one of a title of at least one broadcasting program, a running time of at least one broadcasting program, and an identifier of broadcasting types of at least one broadcasting program.

4. The method according to claim 1, further comprising:
    receiving, from the broadcasting station server, information of a plurality of broadcasting programs broadcasted from the broadcasting station server in real-time,
    wherein the broadcasting program is selected based on the received broadcasting program information.

5. The method according to claim 1, further comprising:
    receiving, from the broadcasting station server, information of a plurality of broadcasting programs stored by the broadcasting station server,
    wherein the broadcasting program is selected based on the received broadcast program information.

6. The method according to claim 1, wherein the selectively transmitted broadcasting program data is transmitted to the mobile terminal through a wireless telephone network.

7. The method according to claim 1, wherein the selectively transmitted broadcasting program data includes only one of the video data, audio data and text data of the broadcasting program.

8. The method according to claim 1, wherein the selectively transmitted broadcasting program data includes only two of the video data, audio data and text data of the broadcasting program.

9. The method according to claim 1, wherein the time-shift function is selectively activated through the mobile terminal to interrupt transmission of the broadcasting program data from the broadcasting station server.

10. The method according to claim 1, wherein step of selecting a broadcasting type through the mobile terminal comprises:
    determining a type of broadcasting data to be excluded from the broadcasting program data selectively transmitted from the broadcasting station server.

11. A broadcasting system, comprising:
    a mobile terminal configured to select a broadcasting program and a broadcasting type of the broadcasting program, receive at least one of video data, audio data, and text data of the broadcasting program, and output the received broadcasting program data, the broadcasting type being selected from at least two of video data broadcasting, audio data broadcasting and text data broadcasting,
    wherein the broadcasting program data is selectively transmitted from a broadcasting station server according to the selected broadcasting type;
    selectively interrupting the output of the broadcasting program data using a time-shift function of the mobile terminal, the time-shift function enabling alternatively received data to be output through the mobile terminal while the broadcasting program data being transmitted from the broadcasting station server is time-shifted according to the time-shift function using a storage medium provided to the broadcasting station server, and
    selectively continuing the output of the broadcasting program data through the mobile terminal by causing the data transmission from the broadcasting station server to continue, the continuing data transmission beginning from a point of data transmission corresponding to the interruption.

12. The broadcasting system according to claim 11, wherein the mobile terminal is configured to receive, from the broadcasting station server, information of a plurality of broadcasting programs broadcasted by the broadcasting station server in real-time and to select the broadcasting program based on the received broadcasting program information.

13. The broadcasting system according to claim 11, wherein the mobile terminal is configured to receive, from the broadcasting station server, information of a plurality of broadcasting programs stored by the broadcasting station server and to select the broadcasting program from a plurality of broadcasting programs stored in the broadcasting station server based on the received broadcasting program information.

14. The broadcasting system according to claim 11, wherein the mobile terminal is configured to select the broadcasting program and the broadcasting type based on broadcasting program information received from the broadcasting station server.

15. The broadcasting system according to claim 14, wherein the broadcasting program information includes at least one of a title of at least one broadcasting program, a running time of at least one broadcasting program and an identifier of broadcasting types of at least one broadcasting program.

16. The broadcasting system according to claim 11, wherein the selectively transmitted data is transmitted to the mobile terminal through a wireless telephone network.

17. The broadcasting system according to claim 11, wherein the mobile terminal is configured to enable selection of only one of the video data, audio data and text data.

18. The broadcasting system according to claim 11, wherein the mobile terminal is configured to enable selection of only two of the video data, audio data, and text data of the broadcasting program and wherein the selection through the mobile terminal causes the selectively transmitted data to include the corresponding two of the video data, audio data, and text data of the broadcasting program.

19. The broadcasting system according to claim 11, wherein the mobile terminal comprises a time-shift function key enabling a user of the mobile terminal to selectively activate the time-shift function to interrupt transmission of the broadcasting program data from the broadcasting station server.

20. The broadcasting system according to claim 11, wherein the mobile terminal is configured to determine a type of broadcasting data to be excluded from the broadcasting program data selectively transmitted from the broadcasting station server.

21. A method of controlling a broadcasting system, the method comprising:
    selecting a broadcasting program through a mobile terminal;
    receiving at the mobile terminal data of the broadcasting program, the broadcasting program data being selectively transmitted from a broadcasting station server according to the selected broadcasting program;
    outputting the broadcasting program data through the mobile terminal;
    selectively interrupting the output of the broadcasting program data using a time-shift function of the mobile terminal, the time-shift function enabling alternatively received data to be output through the mobile terminal while the broadcasting program data being transmitted from the broadcasting station server is time-shifted according to the time-shift function using a storage medium provided to the broadcasting station server; and
    selectively continuing the output of the broadcasting program data through the mobile terminal by causing the data transmission from the broadcasting station server to continue, the continuing data transmission beginning from a point of data transmission corresponding to the interruption.

22. The method according to claim 21, further comprising:
    receiving, from the broadcasting station server, information of a plurality of broadcasting programs stored by the broadcasting station server,
    wherein the broadcasting program is selected based on the received broadcasting program information.

23. The method according to claim 22, wherein the broadcasting program information includes at least one of a title of at least one broadcasting program and a running time of at least one broadcasting program.

24. The method according to claim 21, wherein the time-shift function is selectively activated through the mobile terminal to interrupt transmission of the broadcasting program data from the broadcasting station server.

25. The method according to claim 24, further comprising:
    storing, in a memory of the mobile terminal, received data corresponding to a currently interrupted scene of the broadcasting program in response to the selective activation of the time-shift function; and
    displaying, on a displaying unit of the mobile terminal, the currently interrupted scene while the alternatively received data is being output through the mobile terminal.

* * * * *